US010820008B2

(12) United States Patent
Ikonin et al.

(10) Patent No.: US 10,820,008 B2
(45) Date of Patent: Oct. 27, 2020

(54) APPARATUS AND METHOD FOR VIDEO MOTION COMPENSATION

(71) Applicant: Huawei Technologies Co., Ltd., Shenzhen (CN)

(72) Inventors: Sergey Yurievich Ikonin, Moscow (RU); Maxim Borisovitch Sychev, Moscow (RU); Victor Alexeevich Stepin, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 15/934,098

(22) Filed: Mar. 23, 2018

(65) Prior Publication Data

US 2018/0213251 A1 Jul. 26, 2018

Related U.S. Application Data

(63) Continuation of application No. PCT/RU2015/000610, filed on Sep. 25, 2015.

(51) Int. Cl.
*H04N 19/51* (2014.01)
*H04N 19/82* (2014.01)
(Continued)

(52) U.S. Cl.
CPC ............. *H04N 19/51* (2014.11); *G06T 5/003* (2013.01); *H04N 19/117* (2014.11);
(Continued)

(58) Field of Classification Search
CPC ....... H04N 19/51; H04N 19/82; H04N 19/523
(Continued)

(56) References Cited

U.S. PATENT DOCUMENTS 6,175,656 B1    1/2001 Hoang
7,266,150 B2    9/2007 Demos
(Continued)

FOREIGN PATENT DOCUMENTS

CN    1663258 A    8/2005
CN    103238320 A    8/2013
(Continued)

OTHER PUBLICATIONS

Murakami Atsumichi et al., "High efficiency video coding technology HEVC / H.265 and its application", Corporation Ohm company, 2 pages, with English abstract (2013).
(Continued)

*Primary Examiner* — Jeffery A Williams
(74) *Attorney, Agent, or Firm* — Leydig, Voit & Mayer, Ltd.

(57) ABSTRACT

A video coder for predictive coding a video stream of subsequent frames according to motion compensation into an encoded video bit stream is provided. The video coder comprises a frame configured to store at least one reference frame of the video stream, an inter prediction unit configured to generate a prediction block of a current block of the current frame from a reference block of the reference frame. The prediction block is generated by a motion vector having a fractional-pel resolution, the fractional-pel resolution defines for each integer position of a motion vector a plurality of associated fractional positions. The video coder further comprises a sharpening filter configured to filter the prediction block, and a control unit configured to control the sharpening filter depending on the integer or fractional position of the motion vector used for generating the prediction block.

31 Claims, 9 Drawing Sheets

(51) Int. Cl.
  *H04N 19/523* (2014.01)
  *H04N 19/117* (2014.01)
  *H04N 19/176* (2014.01)
  *H04N 19/44* (2014.01)
  *G06T 5/00* (2006.01)

(52) U.S. Cl.
  CPC .......... *H04N 19/176* (2014.11); *H04N 19/44* (2014.11); *H04N 19/523* (2014.11); *H04N 19/82* (2014.11); *G06T 2207/20201* (2013.01)

(58) Field of Classification Search
  USPC .................................................. 375/240.16
  See application file for complete search history.

(56) References Cited

U.S. PATENT DOCUMENTS

| | | | |
|---|---|---|---|
| 8,705,622 | B2 | 4/2014 | Ye et al. |
| 8,780,971 | B1 | 7/2014 | Bankoski et al. |
| 2002/0063807 | A1 | 5/2002 | Margulis |
| 2003/0194010 | A1 | 10/2003 | Mukerjee et al. |
| 2004/0213470 | A1 | 10/2004 | Sato et al. |
| 2005/0147316 | A1 | 7/2005 | Deshpande |
| 2005/0243913 | A1 | 11/2005 | Kwon et al. |
| 2007/0091997 | A1 | 4/2007 | Fogg et al. |
| 2008/0089417 | A1* | 4/2008 | Bao ............... H04N 19/176 375/240.16 |
| 2008/0109041 | A1 | 5/2008 | De Voir |
| 2008/0205508 | A1* | 8/2008 | Ziauddin ........ H04N 19/436 375/240.01 |
| 2009/0257499 | A1 | 10/2009 | Karczewicz et al. |
| 2010/0002770 | A1 | 1/2010 | Motta et al. |
| 2010/0008430 | A1 | 1/2010 | Karczewicz et al. |
| 2010/0053689 | A1 | 3/2010 | Ohwaku et al. |
| 2010/0111182 | A1 | 5/2010 | Karczewicz et al. |
| 2010/0128995 | A1 | 5/2010 | Drugeon et al. |
| 2010/0284458 | A1 | 11/2010 | Andersson et al. |
| 2011/0096236 | A1 | 4/2011 | Ngan et al. |
| 2011/0299604 | A1 | 12/2011 | Price et al. |
| 2011/0317764 | A1 | 12/2011 | Joshi et al. |
| 2012/0170650 | A1 | 7/2012 | Chong et al. |
| 2012/0200669 | A1 | 8/2012 | Lai et al. |
| 2012/0307900 | A1 | 12/2012 | Demos |
| 2013/0003845 | A1 | 1/2013 | Zhou et al. |
| 2013/0034165 | A1 | 2/2013 | Sasai et al. |
| 2013/0070858 | A1 | 3/2013 | Demos |
| 2013/0077697 | A1* | 3/2013 | Chen ............... H04N 19/176 375/240.25 |
| 2013/0182780 | A1 | 7/2013 | Alshin et al. |
| 2013/0215974 | A1* | 8/2013 | Chong ............. H04N 19/463 375/240.24 |
| 2014/0044161 | A1 | 2/2014 | Chen et al. |
| 2014/0072048 | A1 | 3/2014 | Ma et al. |
| 2014/0133546 | A1 | 5/2014 | Bandoh et al. |
| 2014/0192862 | A1 | 7/2014 | Flynn et al. |
| 2014/0192865 | A1 | 7/2014 | Zhang et al. |
| 2014/0254680 | A1 | 9/2014 | Ho et al. |
| 2015/0078448 | A1 | 3/2015 | Puri et al. |
| 2015/0116539 | A1 | 4/2015 | Nayar et al. |
| 2015/0124864 | A1 | 5/2015 | Kim et al. |
| 2015/0237358 | A1 | 8/2015 | Alshin et al. |
| 2016/0014411 | A1 | 1/2016 | Sychev |
| 2016/0105685 | A1 | 4/2016 | Zou et al. |
| 2018/0048910 | A1 | 2/2018 | Kalevo et al. |
| 2019/0215515 | A1 | 7/2019 | Sychev |

FOREIGN PATENT DOCUMENTS

| | | |
|---|---|---|
| CN | 103650509 A | 3/2014 |
| CN | 104937941 A | 9/2015 |
| EP | 1841230 A1 | 10/2007 |
| EP | 2111719 B1 | 8/2014 |
| EP | 2819413 A1 | 12/2014 |
| EP | 2860980 A1 | 4/2015 |
| JP | 2001057677 A | 2/2001 |
| JP | 2003333604 A | 11/2003 |
| JP | 2004007337 A | 1/2004 |
| JP | 2006067213 A | 3/2006 |
| JP | 2006513592 A | 4/2006 |
| JP | 2008054267 A | 3/2008 |
| JP | 2010507286 A | 3/2010 |
| JP | 2010110004 A | 5/2010 |
| JP | 2011527553 A | 10/2011 |
| JP | 2013542666 A | 11/2013 |
| JP | 2014504098 A | 2/2014 |
| JP | 2015165726 A | 9/2015 |
| RU | 2358410 C2 | 6/2009 |
| RU | 2008106939 A | 8/2009 |
| RU | 2521081 C2 | 6/2014 |
| WO | 2012109528 A1 | 8/2012 |
| WO | 2013058876 A1 | 4/2013 |
| WO | 2013147495 A1 | 10/2013 |
| WO | 2014158050 A1 | 10/2014 |

OTHER PUBLICATIONS

Sychev et al, "Sharpening filter for interlayer prediction", 2014 IEEE Visual Communications and Image Processing Conference, IEEE, XP032741195, Institute of Electrical and Electronics Engineers, New York, New York, (Dec. 2014).

Sychev et al, "Inter-layer prediction modes based on base layer sharpness filter," Joint Collaborative Team on Video Coding (JCT-VC) of ITU-T SG16 WP3 and ISO/IEC JTC 1/SC 29/WG 11, JCTVC-N0070, International Telecommunications Union, Geneva, Switzerland (Jul. 25-Aug. 2, 2013).

"Series H: Audiovisual and Multimedia Systems Infrastructure of audiovisual services—Coding of moving video Advanced video coding for generic audiovisual services," ITU-T H.264, Telecommunication Standardization Sector of ITU, International Telecommunications Union, Geneva Switzerland, (Feb. 2014).

"Line Transmission of Non-Telephone Signals Video Codec for Audiovisual Services at px64 kbits," ITU-T H.261 Telecommunication Standardization Sector of ITU, International Telecommunications Union, Geneva Switzerland, (Mar. 1993).

"Series H: Audiovisual and Multimedia Systems Infrastructure of audiovisual services—Coding of moving video Video coding for low bit rate communication," ITU-T H.263, Telecommunication Standardization Sector of ITU, International Telecommunications Union, Geneva Switzerland, (Jan. 2005).

"Series H: Audiovisual and Multimedia Systems Infrastructure of audiovisual services—Coding of moving video High efficiency video coding," ITU-T H.265, Telecommunication Standardization Sector of ITU, International Telecommunications Union, Geneva Switzerland, (Apr. 2015).

Wedi, "Adaptive Interpolation Filter for Motion Compensated Prediction," IEEE ICIP 2002, Institute of Electrical and Electronics Engineers, New York, New York, (2002).

Vatis et al., "Motion-and Aliasing-Compensated Prediction Using a Two-Dimensional Non-Separable Adaptive Wiener Interpolation Filter," IEEE, Institute of Electrical and Electronics Engineers, New York, New York, (2005).

Rusanovskyy et al., "Video Coding With Low-Complexity Directional Adaptive Interpolation Filters," IEEE Transactions on Circuits and Systems for Video Technology, vol. 19, No. 8, Institute of Electrical and Electronics Engineers, New York, New York, (Aug. 2009).

Dong et al., "Parametric Interpolation Filter for HD Video Coding," IEEE Transactions on Circuits and Systems for Video Technology, vol. 20, No. 12, Institute of Electrical and Electronics Engineers, New York, New York, (Dec. 2010).

Matsuo et al., "Enhanced Region-Based Adaptive Interpolation Filter," 28th Picture Coding Symposium, PCS2010, Nagoya, Japan, (Dec. 8-10, 2010).

Lu et al., "CE6.H related: Results on Modified Binarization for Region Boundary Chain Coding," Joint Collaborative Team on 3D Video Coding Extensions of ITU-T SG 16 WP 3 and ISO/IEC JTC

(56) References Cited

OTHER PUBLICATIONS

1/SC 29/WG 11, 4th Meeting: Incheon, KR, JCT3V-D0077, pp. 1-6, International Telecommunication Union, Geneva, Switzerland (Apr. 20-26, 2013).

Yoon et al.,"Adaptive Filtering for Prediction Signal in Video Compression," 2011 IEEE International Conference on Consumer Electronics—Berlin (ICCE-Berlin), XP031968553, Institute of Electrical and Electronics Engineers, New York, New York (2011).

Ma et al., "SCE4: Switchable De-ringing Filter for Inter-layer Prediction," Joint Collaborative Team on Video Coding (JCT-VC) of ITU-T SG 16 WP 3 and ISO/IEC JTC 1/SC 29/WG 11, 13th Meeting: Incheon, KR, JCTVC-M0055, International Telecommunication Union, Geneva, Switzerland (Apr. 18-26, 2013).

Laude et al., "Motion Blur Compensation in Scalable HEVC Hybrid Video Coding," PCS 2013, 2013 30th Picture Coding Symposium, IEEE, Institute of Electrical and Electronics Engineers, New York, New York (2013).

Ma et al., "De-Ringing Filter for Scalable Video Coding," 2013 IEEE International Conference on Multimedia and Expo Workshops (ICMEW), Institute of Electrical and Electronics Engineers, New York, New York (Jul. 2013).

Helle et al., "A Scalable Video Coding Extension of HEVC," 2013 Data Compression Conference, Institute of Electrical and Electronics Engineers, New York, New York (Mar. 2013).

Alshina et al., "Inter-layer Filtering for Scalable Extension of HEVC," 2013 IEEE, PCS 2013, 2013 30th Picture Coding Symposium, Institute of Electrical and Electronics Engineers, New York New York (2013).

Arad et al., "Enhancement by Image-Dependent Warping," IEEE Transactions on Image Processing, vol. 8, No. 8, pp. 1063-1074, Institute of Electrical and Electronic Engineers, New York, New York (Aug. 1999).

Prades-Nebot et al., "Image enhancement using warping technique," Electronics Letters, vol. 39 No. 1, pp. 32-33, Institute of Electrical and Electronic Engineers, New York, New York (2003).

Yoon et al., "Adaptive Prediction Block Filter for Video Coding," ETRI Journal, vol. 34, No. 1, pp. 106-109 (Feb. 2012).

Maxim et al., "SCE3: Inter-layer prediction modes based on base layer sharpness filter," Joint Collaborative Team on Video Coding (JCT-VC) of ITU-T SG 16 WP 3 and ISO/IEC JTC 1/SC 29/WG 11, JCTVC-O0163, pp. 1-7, International Telecommunication Union, Geneva, Switzerland (Oct. 23-Nov. 1, 2013).

Sajjad et al., "Digital image super-resolution using adaptive interpolation based on Gaussian function," Multimedia Tools and Applications, vol. 74, Issue 20, pp. 8961-8977, Springer Science-Business Media, New York (Jul. 9, 2013).

Turkowski "Filters for Common Resampling Tasks," pp. 1-14 (Apr. 10, 1990).

Ikeda et al., "TE12.2: Results on MC interpolation filters," Joint Collaborative Team on Video Coding (JCT-VC) of ITUT SG16 WP3 and ISO/IEC JTC1/SC29/WG11, JCTVC-C162, 3rd Meeting, Guangzhou, China, International Telecommunication Union, Geneva, Switzerland (Oct. 7-14, 2010).

Ugur et al., "Motion Compensated Prediction and Interpolation Filter Design in H.265/HEVC," IEEE Journal of Selected Topics in Signal Processing, vol. 7, No. 6, pp. 946-956, Institute of Electrical and Electronics Engineers, New York, New York (Dec. 2013).

Liu et al., "Motion Blur Compensation in HEVC Using Fixed-Length Adaptive Filter," IEEE Picture Coding Symposium (PCS 2015), pp. 30-34, Institute of Electrical and Electronics Engineers, New York, New York (2015).

Liu, "Unified Loop Filter for Video Compression," IEEE Transactions on Circuits and Systems for Video Technology, vol. 20, No. 10, pp. 1378-1382, Institute of Electrical and Electronics Engineers, New York, New York (Oct. 2010).

Tsai et al., "Adaptive Loop Filtering for Video Coding," IEEE Journal of Selected Topics in Signal Processing, vol. 7, No. 6, pp. 934-945, Institute of Electrical and Electronics Engineers, New York, New York (Dec. 2013).

Chiu et al., "Adaptive (Wiener) Filter for Video Compression," COM 16-C 437 R1-E, pp. 1-7, International Telecommunication Union, Geneva, Switzerland (Apr. 2008).

Zhang, "Video Image Enhancement Technology Based on Real-time Processing of FPGA," With English Abstract, North University of China, pp. 1-71, North University of China, Tayuan, China (May 2011).

U.S. Appl. No. 15/934,628, filed Mar. 23, 2018.
U.S. Appl. No. 15/934,546, filed Mar. 23, 2018.
U.S. Appl. No. 15/933,974, filed Mar. 23, 2018.
U.S. Appl. No. 15/934,043, filed Mar. 23, 2018.

* cited by examiner

500

```
┌─────────────────────────────────────────┐
│ step of storing at least one reference frame of the │
│ video stream, said reference frame being different  │     501
│ from a current frame of the video stream            │
└─────────────────────────────────────────┘
                      ↓
┌─────────────────────────────────────────┐
│ inter prediction step comprising generating a       │
│ prediction block of a current block of the current  │
│ frame from a reference block of the reference frame,│
│ wherein said prediction block is generated by means │     502
│ of a motion vector having a fractional-pel resolution, │
│ said fractional-pel revolution defining for each integer │
│ position of a motion vector a plurality of associated │
│ fractional positions                                │
└─────────────────────────────────────────┘
                      ↓
┌─────────────────────────────────────────┐
│ Sharpening filter step comprising filtering the     │     503
│ prediction block                                    │
└─────────────────────────────────────────┘
                      ↓
┌─────────────────────────────────────────┐
│ step of controlling the sharpening filter step depending │
│ on the integer or fractional position of the motion │     504
│ vector used for generating the prediction block     │
└─────────────────────────────────────────┘
```

```
┌─────────────────────────────────────────────┐
│ step of storing at least one reference frame obtained │
│ from the encoded video bit stream, said reference    │     601
│ frame being different from a current frame of the    │
│ encoded video bit stream                             │
└─────────────────────────────────────────────┘
                        │
                        ▼
┌─────────────────────────────────────────────┐
│ inter prediction step comprising generating a        │
│ prediction block of a current block of the current   │
│ frame from a reference block of the reference frame, │
│ wherein said prediction block is generated by means  │     602
│ of a motion vector having a fractional-pel resolution,│
│ said fractional-pel revolution defining for each integer│
│ position of a motion vector a plurality of associated│
│ fractional positions                                 │
└─────────────────────────────────────────────┘
                        │
                        ▼
┌─────────────────────────────────────────────┐
│ Sharpening filter step comprising filtering the      │     603
│ prediction block                                     │
└─────────────────────────────────────────────┘
                        │
                        ▼
┌─────────────────────────────────────────────┐
│ step of controlling the sharpening filter step depending│
│ on the integer or fractional position of the motion  │     604
│ vector used for generating the prediction block      │
└─────────────────────────────────────────────┘
```

FIG.6

APPARATUS AND METHOD FOR VIDEO MOTION COMPENSATION

CROSS-REFERENCE TO RELATED APPLICATIONS

This application is a continuation of International Application No. PCT/RU2015/000610, filed on Sep. 25, 2015, the disclosure of which is hereby incorporated by reference in its entirety.

TECHNICAL FIELD

Embodiments of the present disclosure generally relate to the field of video processing and to an apparatus for video motion compensation, and specifically relates to a video coder and to a video decoder for supporting motion compensation to predict frames in a video. Embodiments of the present disclosure relate further to a method for coding and to a method for decoding a video stream using motion compensation. Finally, embodiments of the present disclosure relate to a computer program having a program code for performing such a method.

BACKGROUND

In the field of video processing, and in particular in the field of hybrid video coding and compression, it is known to use inter and intra prediction as well as transform coding. Such hybrid video coding technologies are used in known video compression standards like H.261, H.263, MPEG-1, 2, 4, H.264/AVC or H.265/HEVC.

FIG. 1 shows a video coder according to the state of the art. The video coder 100 comprises an input for receiving input blocks of frames or pictures of a video stream and an output for generating an encoded video bit stream. The video coder 100 is adapted to apply prediction, transformation, quantization, and entropy coding to the video stream. The transformation, quantization, and entropy coding are carried out respectively by a transform unit 101, a quantization unit 102 and an entropy encoding unit 103 so as to generate as an output the encoded video bit stream.

The video stream corresponds to a plurality of frames, wherein each frame is divided into blocks of a certain size that are either intra or inter coded. The blocks of for example the first frame of the video stream are intra coded by means of an intra prediction unit 109. An intra frame is coded using only the information within the same frame, so that it can be independently decoded and it can provide an entry point in the bit stream for random access. Blocks of other frames of the video stream are inter coded by means of an inter prediction unit 110. Information from coded frames, which are called reconstructed reference frames, are used to reduce the temporal redundancy, so that each block of an inter coded frame is predicted from a block of the same size in a reconstructed reference frame. A mode selection unit 108 is adapted to select whether a block of a frame is to be processed by the intra prediction unit 109 or the inter prediction unit 110.

For performing inter prediction, the coded reference frames are processed by an inverse quantization unit 104, an inverse transform unit 105, then added to prediction block and processed by loop filtering unit 106 so as to obtain the reconstructed reference frames that are then stored in a frame buffer 107 to be used for temporal inter frame prediction.

The inter prediction unit 110 comprises as input a current frame or picture to be inter coded and one or several reference frames or pictures from the frame buffer 107. Motion estimation and motion compensation are applied by the inter prediction unit 110. The motion estimation is used to obtain a motion vector and a reference frame based on certain cost function. The motion compensation then describes a current block of the current frame in terms of the transformation of a reference block of the reference frame to the current frame. The inter prediction unit 110 outputs a prediction block for the current block, wherein said prediction block minimizes the difference between the current block to be coded and its prediction block, i.e. minimizes the residual block. The minimization of the residual block is based e.g. on a rate-distortion optimization procedure.

The difference between the current block and its prediction, i.e. the residual block, is then transformed by the transform unit 101. The transform coefficients are quantized and entropy coded by the quantization unit 102 and the entropy encoding unit 103. The thus generated encoded video bit stream comprises intra coded blocks and inter coded blocks.

Such a hybrid video coding comprises motion-compensated prediction combined with transform coding of the prediction error. For each block, the estimated motion vector is also transmitted as signaling data in the encoded video bit stream. Today's standards H.264/AVC and H.265/HEVC are based on ¼ pel displacement resolution for the motion vector. In order to estimate and compensate the fractional-pel displacements, the reference frame has to be interpolated on the fractional-pel positions. To obtain such an interpolated frame on the fractional-pel positions, an interpolation filter is used in the inter prediction unit 110.

The quality of the interpolated frame strongly depends on the properties of the used interpolation filter. Short-tap filters, e.g. bilinear filters, may suppress high frequencies and make the interpolated frame blurred. Other filters like long-tap filters may preserve high frequencies but generate some ringing artifacts in the neighborhood of sharp edges. Another problem is that the motion compensation makes use of a previously encoded and reconstructed frame as a reference frame: the reference frame may contain artifacts caused by quantization of transform coefficient, which is referred to as Gibbs effect. Because of these artifacts, the edges as well as the area around the edges may also be distorted.

It is known in the conventional art that the quality of the edges may be increased by applying a sharpening or de-blurring post-filter to the decoded frame. The problem of such post-filtering design is that the sharpening filter is not included in to encoding process. Thus the effect of the sharpening filter cannot be taken into account during the rate-distortion optimization procedure. This may lead to reduced objective quality metrics, like the peak signal-to-noise-ratio (PSNR).

To increase the objective quality, it is also known in the conventional art to include a sharpening filter into the loop filtering unit 106. Accordingly, the sharpening filter is applied to the reconstructed reference frame and may improve motion-compensated prediction by removing compression artifacts in the reference frame. However such a loop filtering technique cannot remove artifacts caused by the motion interpolation filter.

SUMMARY

Having recognized the above-mentioned disadvantages and problems, the embodiments of the present disclosure are developed aiming to improve the state of the art. Embodiments of the present disclosure provide a video coder, a coding method, a video decoder, and a decoding method allowing for an improved coding and decoding of a video stream of subsequent frames.

Embodiments of the present disclosure, for example, allow to improve the quality of the inter predictive coding. For example, the disclosure allows to remove artifacts caused by the motion estimation and motion compensation. For example, the present disclosure allows to reduce negative effects of the motion interpolation filter, i.e. to reduce negative effects of the interpolation of the reference frame on fractional-pel positions as well as improving quality of prediction by reducing quantization artifacts of reference frame.

Embodiments of the disclosure provide implementations as provided in the enclosed independent claims. Additional advantageous implementations of the present disclosure are further defined in the respective dependent claims.

A first aspect of the present disclosure provides a video coder for predictive coding a video stream of subsequent frames according to motion compensation into an encoded video bit stream. The video coder comprises a frame buffer configured to store at least one reference frame of the video stream, said reference frame being different from a current frame of the video stream. The video coder comprises an inter prediction unit configured to generate a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions. The video coder comprises a sharpening filter configured to filter the prediction block. The video coder comprises a control unit configured to control the sharpening filter depending on the integer or fractional position of the motion vector used for generating the prediction block.

Thereby, applying the sharpening filter to the prediction block improves the quality of the inter predictive coding in that it removes or at least reduces the ringing artifacts caused by the interpolation of the reference frame/block on fractional-pel positions, i.e. caused by the motion interpolation filter, while advantageously keeping quality interpolated edges. It also allows to remove or at least reduce the ringing artifacts, also referred to as Gibbs effect, caused by the quantization of transform coefficients in the reference block. It further on allows to reduce the blurring of edges caused by the quantization and motion interpolation, and also to reduce the blurring of edges caused by motion blur. Additionally, the present disclosure allows to increase the subjective quality of edges in the reconstructed frame/block.

Thereby, the placement of the sharpening filter according to the disclosure after the motion interpolation filter, i.e. after the inter prediction unit, causes the sharpening filter to carry out the task of the in-loop reference filters, i.e. of the loop filtering unit, while at the same time the artifacts caused by motion interpolation filtering can be removed or at least reduced. Also, the use of the fractional motion vector positions for controlling the sharpening filter is advantageous in that it avoids direct signaling of enabling or disabling sharpening filter as well as adaptive coefficients of the filter by using fractional motion vector positions as signaling points, and in that it reduces signaling overhead allowing to find better rate-distortion trade-off for adaptive sharpening prediction filter tool. The proposed approach makes it possible to adapt to local features of the video content and particularly of the prediction block, so that the coding of even small blocks only requires a reduced signaling overhead for the transmission to a decoder.

In an implementation form of the video coder according to the first aspect, the sharpening filter comprises at least one adaptive parameter. The control unit is configured to control the sharpening filter by choosing a parameter value for the adaptive parameter depending on the integer or fractional position of the motion vector, and by applying the chosen parameter value to the sharpening filter.

Thereby, the prediction block is filtered by a sharpening filter that can be adapted to the specific content of the video. The adaptation can take account of local features of the video content and the required signaling overhead can be limited due to the use of the fractional motion vector positions for controlling the sharpening filter.

In a further implementation form of the video coder according to the first aspect, each integer or fractional position of the motion vector is associated with a parameter value for the adaptive parameter. In case the adaptive sharpening filter has several adaptive parameters each integer or fractional position of the motion vector may be associated with a set of values of adaptive parameters.

Thereby, it is ensured that the position of each motion vector can be used to obtain the parameter value and therefore to control the sharpening filter.

In a further implementation form of the video coder according to the first aspect, at least one integer or fractional position of the motion vector has no associated parameter value. The control unit is configured to cause a bypass of the sharpening filter if no parameter value is associated to the position of the motion vector.

Thereby, it possible to bypass the sharpening filter without having to send additional signaling data to the decoder.

In a further implementation form of the video coder according to the first aspect, the video coder comprises a plurality of sharpening filters configured to filter the prediction block. The control unit is configured to choose one of the plurality of sharpening filters depending on the integer or fractional position of the motion vector. The control unit is configured to apply the chosen sharpening filter to the prediction block.

Thereby, this solution additionally increases the adaptiveness of the video coder to the content of the video stream. The control unit may indeed control the plurality of sharpening filters in that it chooses one of the sharpening filters depending on the integer or fractional position of the motion vector.

In a further implementation form of the video coder according to the first aspect, the sharpening filter comprises an edge map calculation unit adapted to generate an edge map of a source block, said source block being the reference block or the prediction block. The sharpening filter comprises a blurring filter adapted to blur the edge map of the source block. The sharpening filter comprises a high-pass filter adapted to generate, by high-pass filtering the blurred edge map, a derivative vector for each position of the source block. The sharpening filter comprises a scaling unit adapted to generate a displacement vector by scaling the derivative vector with a sharpening strength coefficient. The sharpening filter comprises a warping unit adapted to warp the prediction block based on the displacement vector. The adaptive parameter is the sharpening strength coefficient.

Thereby, this structure of the sharpening filter defines a non-linear sharpening filter that advantageously can provide better results in terms of elimination of ringing artifacts. Also, the use of the sharpening strength coefficient as adaptive parameter implies that only one adaptive parameter is required, which further reduces the signaling overhead.

In a further implementation form of the video coder according to the first aspect, the control unit is configured to control at least one of a bypass and an application of a prediction block filtering by the sharpening filter depending on the integer or fractional position of the motion vector.

Thereby, a decision can be taken by the control unit to apply or bypass the sharpening filter. The decision can then be adapted to each particular case, for example to the particular video stream to be encoded. Also, the sharpening filter can be bypassed to save computational resources in the video coder. On the other hand, the sharpening filter can be applied if the priority shall be given to the improvement of the interpolation quality and the reduction of artifacts. The dependence on the position of the motion vector further reduces the signaling overhead.

In a further implementation form of the video coder according to the first aspect, a sharpening pattern respectively defines sharpening information for an integer position of a motion vector and one or more associated fractional positions. The control unit is configured to utilize at least one sharpening pattern, and thereby control the sharpening filter depending on the sharpening information defined in the at least one sharpening pattern at the position corresponding to the motion vector used for generating the prediction block.

Thereby, the provision of several different fractional signaling patterns e.g. for one frame is advantageous in that it is possible to additionally increase the content adaptiveness.

In a further implementation form of the video coder according to the first aspect, the control unit is configured to utilize a single sharpening pattern.

Thereby, the signaling overhead that is required for the control of the sharpening filter and that is transmitted to a decoder can be reduced.

In a further implementation form of the video coder according to the first aspect, the control unit is configured to modify the single sharpening pattern, and is particularly configured to modify the single sharpening pattern for each prediction block, for an arbitrary or regular region of the current frame, at a frame level, at a GOP (group of pictures) level, at a PPS (picture parameter set) level or at an SPS (sequence parameter set) level.

Thereby, it is possible to set the sharpening pattern to a desired granularity so that the signaling can be optimized.

In a further implementation form of the video coder according to the first aspect, a plurality of sharpening patterns are defined and the control unit is configured to select one of the sharpening patterns based on a minimization of a residual block, said residual block being the difference between the current block and the prediction block, or based on a cost criterion that is for example a rate distortion optimization.

Thereby, the motion compensation can be further improved. The residual blocks obtained for different sharpening patterns can be compared. By selecting the prediction block that minimizes the residual block or that minimizes a cost criterion, the motion compensation can be improved. The sharpening pattern corresponding to the chosen prediction block is then chosen from among the different sharpening patterns so as to improve the motion compensation.

In a further implementation form of the video coder according to the first aspect, the video coder comprises an encoding unit configured to generate the encoded video bit stream, and to add the index of the sharpening pattern selected by the control unit in the encoded video bit stream.

Thereby, when decoding the encoded video bit stream, it is possible to obtain this sharpening pattern index and to accordingly control the sharpening filter on the decoder side, so as to guarantee a correct decoding.

In a further implementation form of the video coder according to the first aspect, the at least one sharpening pattern is pre-stored in a memory accessible by the control unit. For example, the sharpening pattern may be pre-stored in a memory of a video decoder configured to decode said encoded video bit stream.

Thereby, it is not necessary to add the at least one sharpening pattern as signaling information to the encoded video bit stream. The overall signaling can then be reduced. The fact that the sharpening pattern is known in advance (i.e., pre-stored) means, e.g., that the at least one sharpening pattern is pre-stored in the control unit before encoding or decoding said video stream. In case of a plurality of sharpening patterns, is it possible to signal to the decoder the selected sharpening pattern by adding in the encoded video bit stream an identification or index of the selected sharpening pattern. After the decoder obtains this identification or index, it is able to select the correct pattern from the patterns that are pre-stored in the decoder.

In a further implementation form of the video coder according to the first aspect, the video coder comprises an encoding unit configured to generate the encoded video bit stream, and to add the at least one sharpening pattern of the control unit in the encoded video bit stream.

Thereby, the decoder is able to obtain the sharpening pattern and to correctly decode the encoded video.

In a further implementation form of the video coder according to the first aspect, the control unit is configured to change the number of sharpening patterns and/or the sharpening information of the at least one sharpening pattern.

Thereby, the coder can adapt the sharpening pattern if necessary. The video coder can also e.g. increase the number of sharpening patterns so as to provide an increased adaptiveness with respect to the video content.

In a further implementation form of the video coder according to the first aspect, the number of sharpening patterns and/or the sharpening information of the at least one sharpening pattern is changed for each prediction block, for an arbitrary or regular region of the frame, at a frame level, at a GOP (group of pictures) level, at a PPS (picture parameter set) level or at an SPS (sequence parameter set) level.

Thereby, it is possible to set the content and the number of the sharpening patterns to a desired granularity so that the signaling can be optimized.

In a further implementation form of the video coder according to the first aspect, the sharpening information is a value of an adaptive parameter of the sharpening filter or is a value defining an application or bypassing of the sharpening filter.

Thereby, the sharpening pattern can comprise information that is necessary for the control of the sharpening filter.

In a further implementation form of the video coder according to the first aspect, the inter prediction unit comprises an interpolation unit configured to interpolate the reference block at a fractional position.

Thereby, the inter prediction can be improved and the fractional position of the interpolation can be used for the control of the sharpening filter.

A second aspect of the present disclosure provides a method for predictive coding a video stream of subsequent frames according to motion compensation into an encoded video bit stream. The method comprises storing at least one reference frame of the video stream, said reference frame being different from a current frame of the video stream. The method comprises generating a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions. The method comprises applying a sharpening filter to the prediction block. The method comprises controlling the application of the sharpening filter depending on the integer or fractional position of the motion vector used for generating the prediction block.

Further features or implementations of the method according to the second aspect of the disclosure can perform the functionality of the video coder according to the first aspect of the disclosure and its different implementation forms.

A third aspect of the present disclosure provides a video decoder for decoding an encoded video bit stream obtained by predictive coding a video stream of subsequent frames according to motion compensation. The video decoder comprises a frame buffer configured to store at least one reference frame obtained from the encoded video bit stream, said reference frame being different from a current frame of the encoded video bit stream. The video decoder comprises an inter prediction unit configured to generate a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions. The video decoder comprises a sharpening filter configured to filter the prediction block. The video decoder comprises a control unit configured to control the sharpening filter depending on the integer or fractional position of the motion vector used for generating the prediction block.

Thereby, the advantages obtained with respect to the video coder according to the first aspect are also given with respect to the video decoder according to the third aspect.

In an implementation form of the video decoder according to the third aspect, the control unit is configured to control at least one of a bypass and an application of a first prediction block filtering by the sharpening filter depending on the integer or fractional position of the motion vector.

Thereby, the decision to bypass or apply the sharpening filer unit can be adapted to each particular case. Also, the sharpening filter can be bypassed to save computational resources in the video coder and the video decoder. On the other hand, the sharpening filter can be applied if the priority shall be given to the improvement of the interpolation quality and the reduction of artifacts. The dependence on the position of the motion vector further reduces the signaling overhead.

In an implementation form of the video decoder according to the third aspect, a sharpening pattern sharpening pattern respectively defines sharpening information for an integer position of a motion vector and one or more associated fractional positions. The control unit is configured to utilize at least one sharpening pattern, and thereby control the sharpening filter depending on the sharpening information defined in the at least one sharpening pattern at the position corresponding to the motion vector used for generating the prediction block.

Thereby, the provision of several different fractional signaling patterns e.g. for one frame is advantageous in that it is possible to additionally increase the content adaptiveness.

In an implementation form of the video decoder according to the third aspect, the video decoder comprises a decoding unit configured to decode at least one sharpening pattern from the encoded video bit stream. The control unit is configured to control the sharpening filter depending on the sharpening information defined in the sharpening pattern decoded by the decoding unit.

Thereby, the video decoder is able to obtain the sharpening pattern and to correctly decode the encoded video.

In an implementation form of the video decoder according to the third aspect, the at least one sharpening pattern is pre-stored in a memory accessible by the control unit. For example, the sharpening pattern may be pre-stored in a memory of a video coder configured to generate said encoded video bit stream.

Thereby, it is not necessary to add the at least one sharpening pattern as signaling information to the encoded video bit stream. The overall signaling can then be reduced. The fact that the sharpening pattern is known in advance means e.g. that the at least one sharpening pattern is pre-stored before receiving and decoding said encoded video bit stream.

In an implementation form of the video decoder according to the third aspect, the sharpening pattern is used for each prediction block, for an arbitrary or regular region of the frame, at a frame level, at a GOP (group of pictures) level, at a PPS (picture parameter set) level or at an SPS (sequence parameter set) level depending on selected sharpening pattern information of the encoded video bit stream.

Thereby, it is possible to adapt the granularity of the sharpening pattern so that the signaling can be optimized.

In an implementation form of the video decoder according to the third aspect, the control unit is configured to utilize a single sharpening pattern.

Thereby, the signaling overhead that is required for the control of the sharpening filter can be reduced.

In an implementation form of the video decoder according to the third aspect, the single sharpening pattern is pre-stored in a memory accessible by the control unit.

In an implementation form of the video decoder according to the third aspect, the control unit is configured to modify the single sharpening pattern for each prediction block, for an arbitrary or regular region of the current frame, at a frame level, at a GOP (group of pictures) level, at a PPS (picture parameter set) level or at an SPS (sequence parameter set) level.

In an implementation form of the video decoder according to the third aspect, the control unit is configured to modify the single sharpening pattern for each prediction block, for an arbitrary or regular region of the current frame, at a frame level, at a GOP (group of pictures) level, at a PPS (picture parameter set) level or at an SPS (sequence parameter set) level depending on sharpening pattern information of the encoded video bit stream.

In an implementation form of the video decoder according to the third aspect, the sharpening information is a value of an adaptive parameter of the sharpening filter or is a value defining an application or bypassing of the sharpening filter.

Further features or implementations of the video coder according to the first aspect of the disclosure, e.g. regarding the sharpening filter and its structure, are also applicable to the video decoder according to the third aspect of the disclosure.

A fourth aspect of the present disclosure provides a method for decoding an encoded video bit stream obtained by predictive coding a video stream of subsequent frames according to motion compensation. The method comprises storing at least one reference frame obtained from the encoded video bit stream, said reference frame being different from a current frame of the encoded video bit stream. The method comprises generating a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions. The method comprises applying a sharpening filter to the prediction block. The method comprises controlling the sharpening filter application depending on the integer or fractional position of the motion vector used for generating the prediction block.

Further features or implementations of the method according to the fourth aspect of the disclosure can perform the functionality of the video decoder according to the third aspect of the disclosure and its different implementation forms.

A fifth aspect of the present disclosure provides a computer program having a program code for performing such a coding and/or decoding method when the computer program runs on a computing device.

The disclosure proposes a motion compensation improvement by applying an adaptive sharpening filter to the motion prediction signal i.e. to the prediction blocks. It is proposed to improve the motion compensation by reducing ringing artifacts and increasing the sharpness of edges in motion prediction blocks. It is proposed to apply the sharpening filter as a prediction filter that may be placed both in the coder and the decoder for motion compensation enhancement. The disclosure proposes to use, for example, motion vector positions as signaling points for applying or bypassing the sharpening filter and for signaling adaptive sharpening filter parameter(s) in case the filter is applied. Fractional positions may be used to signal a value or different values of the adaptive parameter/coefficient. A non-linear sharpening prediction filter can be used for motion compensation improvement, including implementations with only a single adaptive parameter. To additionally increase content adaptiveness several different fractional signaling patterns may be defined for one frame. An optimal pattern may be chosen and signaled for each particular region of a coding picture.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above aspects and implementation forms of the present disclosure will be explained in the following description of specific embodiments in relation to the enclosed drawings, in which FIG. 5 shows a video coding method according to an embodiment of the present disclosure, FIG. 6 shows a video decoding method according to an embodiment of the present disclosure.

DETAILED DESCRIPTION OF EMBODIMENTS

Figure 2:
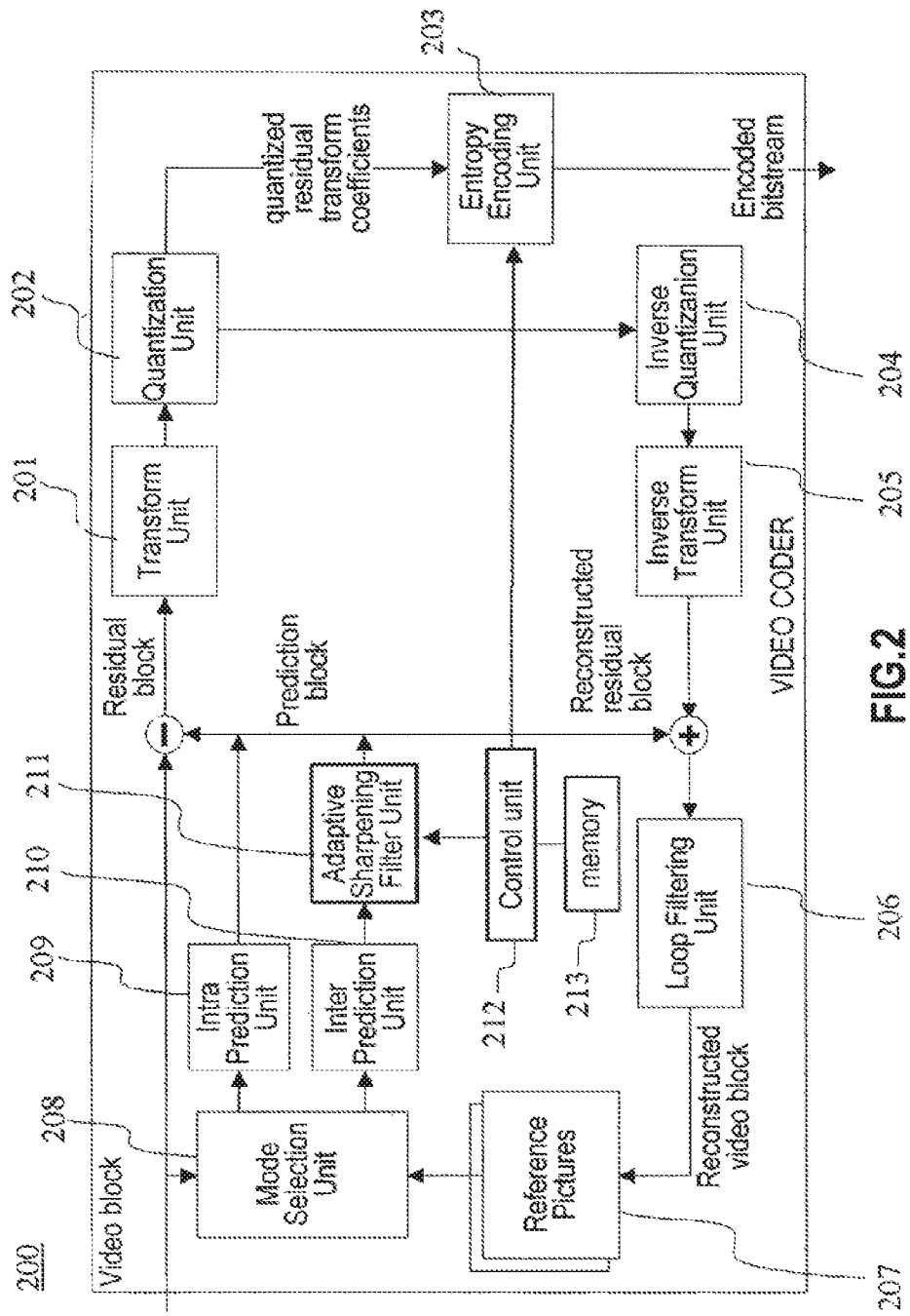
FIG. 2 shows a video coder according to an embodiment of the present disclosure.

FIG. 2 shows a video coder according to an embodiment of the present disclosure, and particularly a video coder 200 for predictive coding a video stream of subsequent frames according to motion compensation into an encoded video bit stream.

The video coder 200 comprises particularly a frame buffer 207, an inter prediction unit 210, a sharpening filter 211 and a control unit 212.

The frame buffer 207 is adapted to store at least one reference frame or picture of the video stream. The reference frame is different from a current frame of the video stream. Particularly and in the context of the disclosure, the current frame is a frame of the video stream that is currently encoded, while the reference frame is a frame of the video stream that has already been encoded. In the followings, any reference to the feature "frame" may be replaced by a reference to the feature "picture".

The inter prediction unit 210 is adapted to generate a prediction block of a current block of the current frame from a reference block of the reference frame. The reference frame is preferably the reference frame stored in the frame buffer 207, while the current block preferably corresponds to the input of the video coder 200 referred to as video block in FIG. 2.

The prediction block is generated by means of a motion vector having a fractional-pel resolution, said fractional-pel resolution defining for each integer position of a motion vector a plurality of associated fractional positions, Particularly, the current frame is encoded using an inter coding technique, i.e. the current frame is predicted from the at least one reference frame that is distinct from the current frame. The reference frame can be a previous frame, i.e. a frame that is located prior to the current frame within the video stream of subsequent frames. Alternatively if forward prediction is used, the reference frame can be a future frame, i.e. a frame that is located after the current frame. In case of a plurality of reference frames, at least one can be such a previous frame and at least one of them can be such a future frame. A reference frame can be intra coded, i.e. can be coded without using any further frame and without any dependence on other frames, so that it can be independently decoded and it can serve as entry point for random video access.

Particularly, the inter prediction unit 210 is adapted to perform motion estimation by generating a motion vector and estimating motion between the reference block of the reference frame and the current block of the current frame. As mentioned above, the motion vector has a fractional-pel resolution, i.e. it can present an integer position or a fractional position. Said motion estimation is performed during encoding to find the motion vector pointing to the best reference block in the reference frame based on certain cost function being for example the rate-distortion optimization. Beside the motion estimation, the inter prediction unit 210 is further adapted to perform motion compensation by generating the prediction block for the current block on the basis of the motion vector and the reference block.

Particularly, the motion prediction comprises a motion estimation unit and a motion compensation unit. The motion vector is generated by using a motion estimation unit. The reference block and the current block are preferably a respective area or sub-area of the reference frame and the current frame. Such a block may have a regular shape, like e.g. a rectangular shape, or an irregular shape. Alternatively, the blocks can have the same size as the frames. Both the current block and the reference block have the same size. The size of the blocks can be defined by means of block mode information transmitted as side information or signaling data to the decoder. A block can correspond to a coding unit that is a basic coding structure of the video sequence of a pre-defined size, containing a part of a frame, e.g. 64×64 pixels.

The prediction block is generated for the current block in view of the reference block. Particularly, a plurality of prediction blocks can be generated for a plurality of current blocks of the current frame in view of a plurality of reference blocks. These reference blocks can be part of a single reference frame or can be selected from different reference frames. Several prediction blocks can be generated for the current frame, and the prediction blocks generated for the current frame can be combined to obtain a prediction frame of the current frame.

The sharpening filter 211 is an adaptive sharpening filter that is configured to adaptively filter the prediction block. The sharpening filter 211 is thus applied to the prediction block generated by the inter prediction unit 210. The sharpening filter 211 proposed by the disclosure is added after the inter prediction unit 210 so as to enhance the prediction block obtained by the inter prediction, i.e. obtained by the motion prediction comprising the motion estimation and the motion compensation. The sharpening filter 211 is thus adapted to generate a sharpened prediction block.

The control unit 212 is configured to control the sharpening filter depending on the integer or fractional position of the motion vector used for generating the prediction block.

The control unit 212 is configured to apply or bypass the sharpening filter depending on the integer or fractional position of the motion vector, and supply the chosen parameter value to the adaptive sharpening filter 211.

The sharpening filter 211 advantageously utilizes at least one adaptive parameter. The control unit 212 may be configured to select a parameter value of the adaptive parameter depending on the integer or fractional position of the motion vector, and to apply the chosen parameter value to the adaptive sharpening filter 211 when the sharpening filter is applied.

Preferably, the adaptive sharpening filter 211 utilizes only one adaptive parameter that is set by the control unit 212.

Figure 1:
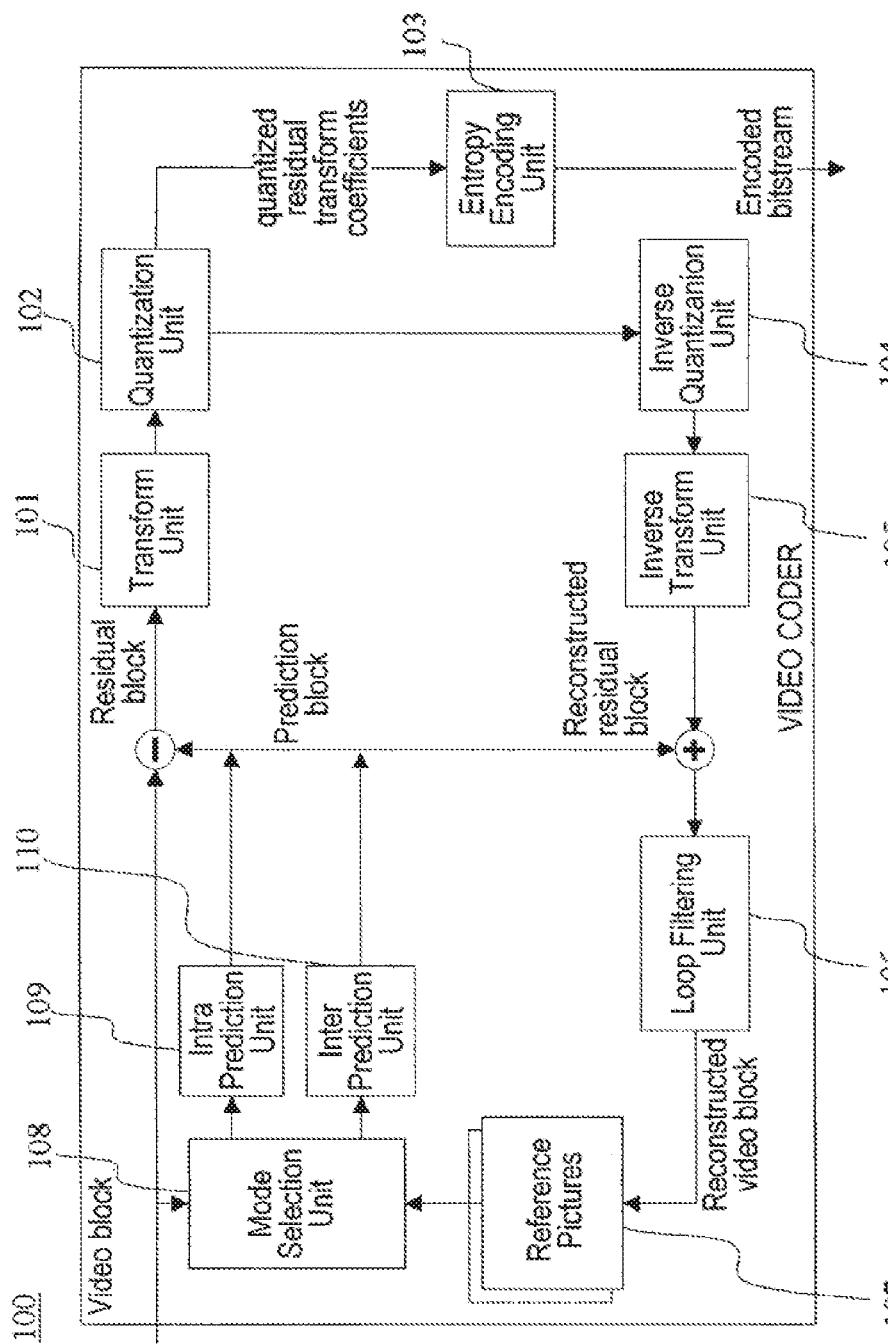
FIG. 1 shows a video coder according to the state of the art.

The video coder 200 of FIG. 2 comprises further units similar to the video coder 100 of FIG. 1 for particularly supporting hybrid video coding. For example, the video coder 200 comprises similar units that are a transform unit 201, a quantization unit 202 and the entropy encoder or entropy encoding unit 203 for, as already known in the art, generating transform coefficients via a transformation into the frequency domain, quantizing the coefficients and entropy coding the quantized coefficients for example together with signaling data. The input of the transform unit 201 is a residual block defined as being the difference between the current block of the current frame, referred to as video block in FIG. 2, and the prediction block outputted by the inter prediction unit 210, the sharpening filter 211 or an intra prediction unit 209. The entropy encoding unit 203 is adapted to generate as an output the encoded video bit stream. The entropy encoding unit 203 is further on adapted to add the motion vector generated by the inter prediction unit 210 as signaling data in the encoded video bit stream.

The video coder 200 comprises further similar units that are an inverse quantization unit 204, an inverse transform unit 205 and a loop filtering unit 206. The quantized transform coefficients generated by the quantization unit 202 are inverse quantized and inverse transformed by respectively the inverse quantization unit 204 and inverse transform unit 205 to obtain a reconstructed residual block corresponding to the residual block fed to the transform unit 201. The reconstructed residual block is then added to the prediction block previously used for generating the residual block, so as to obtain a reconstructed current block corresponding to the current block, this reconstructed current block being referred to as reconstructed video block in FIG. 2.

The reconstructed current block may be processed by the loop filtering unit 206 to smooth out artifacts that are introduced by the block-wise processing and quantization. The current frame, which comprises at least one current block or advantageously a plurality of current blocks, can then be reconstructed from the reconstructed current block (s). This reconstructed current frame can be stored in the frame buffer 207 for serving as reference frame for inter prediction of another frame of the video stream.

A mode selection unit 208 is provided in the video coder 200 for, similarly to FIG. 1, selecting whether an input block of the video coder 200 is to be processed by the intra prediction unit 209 or the inter prediction unit 210. The mode selection unit 208 correspondingly chooses if a block of a frame is to be intra coded using only information from this frame, or is to be inter coded using additional information from other frames i.e. from at least one reference frame stored in the frame buffer 207.

The intra prediction unit 209 is responsible for the intra prediction and generates a prediction block based on intra prediction. As mentioned above, the inter prediction unit 210 is responsible for the inter prediction and generates a prediction block that is predicted from a block of the same size in a reference frame, so as to reduce the temporal redundancy.

Particularly, the sharpening filter 211 may be always applied. This means that the prediction block generated by the inter prediction unit 210 is always fed to the sharpening filter 211, and that the residual block is always obtained by the difference of the current block and the sharpened prediction block that is outputted by the sharpening filter 211.

Alternatively, the sharpening filter 211 may be applied or bypassed. In case the sharpening filter 211 is applied, the sharpening filter 211 generates a sharpened prediction block, and the residual block is obtained by the difference of the current block and the sharpened prediction block that is outputted by the sharpening filter 211. In case the sharpening filter 211 is bypassed, the residual block is obtained by the difference of the current block and the prediction block that is outputted by the inter prediction unit 210.

At least one of application and bypassing of the sharpening filter 211 may be controlled by the control unit 212 depending on the integer or fractional position of the motion vector. Particularly, some of the integer or fractional positions of the motion vector can be associated with a parameter value for the adaptive parameter. Some positions may have no associated values. Then, the decision of the control unit 212 to apply or bypass the sharpening filter 211 depends on whether or not a given integer or fractional position has an associated value for the adaptive parameter.

Preferably, a sharpening pattern respectively defines sharpening information for an integer position of a motion vector and one or more associated fractional positions. The sharpening information is preferably includes one or more values of the adaptive parameter for the sharpening filter 211 or is a value defining an application or bypassing of the sharpening filter 211.

The control unit 212 may utilize at least one sharpening pattern, and is configured to control the sharpening filter 211 depending on the sharpening information defined in the sharpening pattern for the position corresponding to the motion vector used for generating the prediction block. That is, sharpening information associated or assigned to a position that matches the motion vector, as explained in more detail in FIGS. 7 to 9. The at least one sharpening pattern may be pre-stored in a memory 213 accessible by the control unit 212. FIG. 2 shows an embodiment with the memory 213 being located in the video coder 200. Alternatively, the memory may be located outside of the video coder 200, as long as its content is accessible for the control unit 212.

The granularity of the adaptive parameter information and/or sharpening filter information can vary. The sharpening pattern containing sharpening filter information can be pre-stored in both the coder and the decoder. To increase adaptiveness to content the sharpening patter can be for example changed at a block level for each prediction block, for an arbitrary or regular region of the frame, at a frame level, at a GOP (group of pictures) level, at a PPS (picture parameter set) level or at an SPS (sequence parameter set) level. The encoding unit 203 may add sharpening pattern information to encoded bit stream at the same level where sharpening patter has changed.

Figure 3:
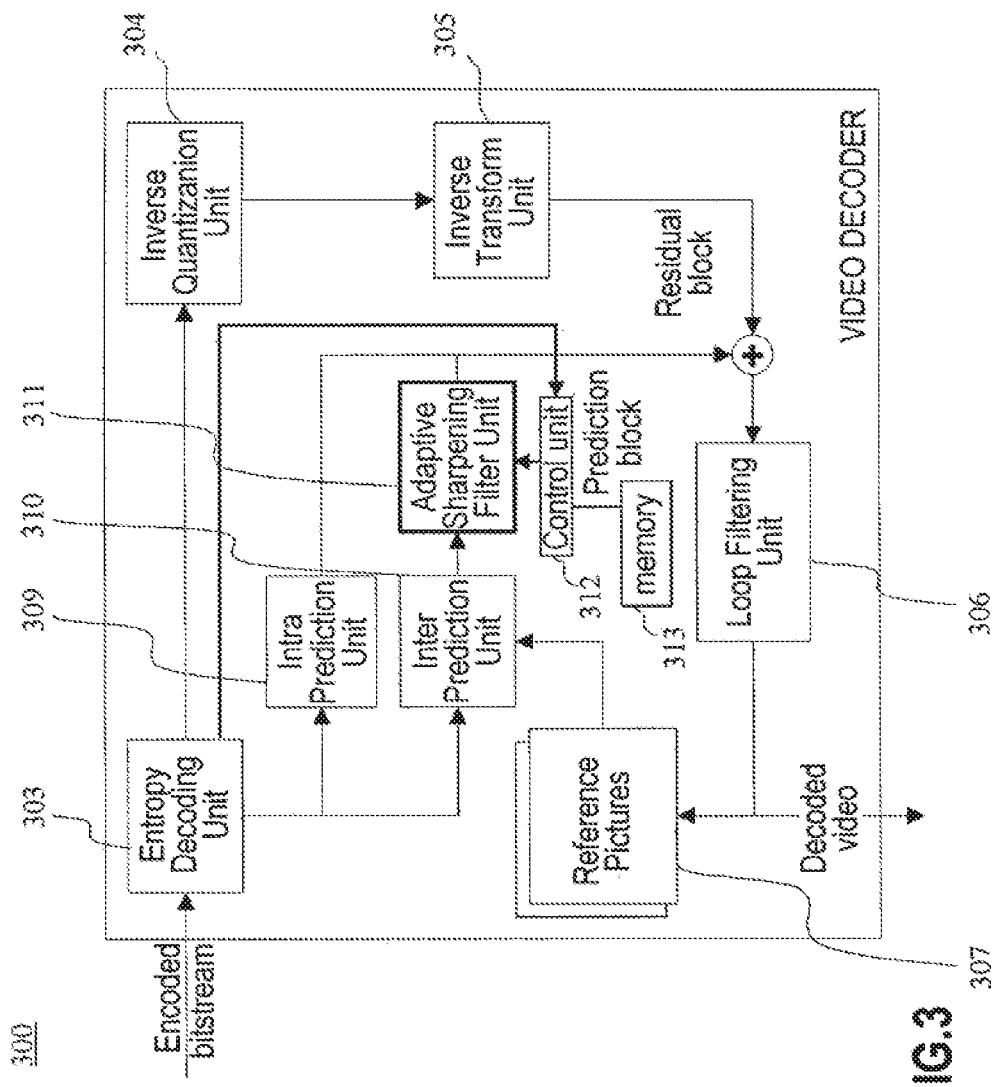
FIG. 3 shows a video decoder according to an embodiment of the present disclosure.

FIG. 3 shows a video decoder according to an embodiment of the present disclosure, and particularly a video decoder 300 for decoding an encoded video bit stream obtained by predictive coding a video stream of subsequent frames according to motion compensation.

The video decoder 300 comprises particularly a frame buffer 307, an inter prediction unit 310, and an adaptive sharpening filter 311. The frame buffer 307 is adapted to store at least one reference frame obtained from the encoded video bit stream, said reference frame being different from a current frame of the encoded video bit stream. The inter prediction unit 310 is adapted to generate a prediction block of a current block of the current frame from a reference block of the reference frame. The adaptive sharpening filter 311 is configured to adaptively filter the prediction block.

Advantageously, the video decoder 300 comprises a control unit 312, and the adaptive sharpening filter 311 utilizes at least one adaptive parameter. The control unit 312 is configured to decide if the sharpening filter should be applied or bypassed, choose a parameter value of the adaptive parameter, and to supply the chosen parameter value to the adaptive sharpening filter 311 in case the filter is applied.

The control unit 312 is particularly configured to decide if the sharpening filter should be applied or bypassed and select the parameter value of the adaptive parameter depending on the integer or fractional position of the motion vector used for generating the prediction block.

Particularly, the motion vector is obtained by the decoder 300 from the encoded video bit stream. The encoded video bit stream generated by the video coder 200 indeed comprises as signaling data said motion vector. The decoder 300 is adapted to obtain the motion vector from the encoded video bit stream by means of an entropy decoding unit 303.

Particularly, some of the integer or fractional positions of the motion vector may have an associated parameter value for the adaptive parameter. Some positions may have no associated values. If a particular integer or fractional position has an associated parameter value, then the adaptive sharpening filter may be applied to the prediction block using an associated value as adaptive parameter.

The decoder 300 is adapted to decode the encoded video bit stream generated by the video coder 200, and both the decoder 300 and the coder 200 generate identical predictions. The features of the frame buffer 307, the inter prediction unit 310, and the sharpening filter 311 are similar to the features of the frame buffer 207, the inter prediction unit 210, and the sharpening filter 211 of FIG. 2.

For ensuring identical prediction on the coder side and on the decoder side, the sharpening pattern, which defines the usage of the sharpening filter and if present the corresponding adaptive parameter(s) for each integer or fractional position of the motion vector, should be known both on the coder and on the decoder side. The sharpening pattern may be pre-stored both on the coder, e.g. in the memory 213 shown in FIG. 2, and the decoder side. At the decoder side, the sharpening pattern may be pre-stored in a memory 313 accessible by the control unit 312. FIG. 3 shows an embodiment with the memory 313 being located in the video decoder 300. Alternatively, the memory may be located outside of the video decoder, as long as its content is accessible for the control unit 312.

The sharpening pattern can be updated with desired granularity. In case the sharpening pattern is updated by the coder, the entropy decoding unit 303 is adapted to decode corresponding sharpening pattern information added by the video coder 200 to the encoded video bit stream.

Particularly, the video decoder 300 comprises further units that are also present in the video coder 200 like e.g. an inverse quantization unit 304, an inverse transform unit 305, a loop filtering unit 306 and an intra prediction unit 309, which respectively correspond to the inverse quantization unit 204, the inverse transform unit 205, the loop filtering unit 206 and the intra prediction unit 209 of the video coder 200. The entropy decoding unit 303 is adapted to decode the received encoded video bit stream and to correspondingly obtain quantized residual transform coefficients and, if present, sharpening filter information. The quantized residual transform coefficients are fed to the inverse quantization unit 304 and an inverse transform unit 305 to generate a residual block. The residual block is added to a prediction block and the addition is fed to the loop filtering unit 306 to obtain the decoded video. Frames of the decoded video can be stored in the frame buffer 307 and serve as a reference frame for inter prediction.

Figure 4:
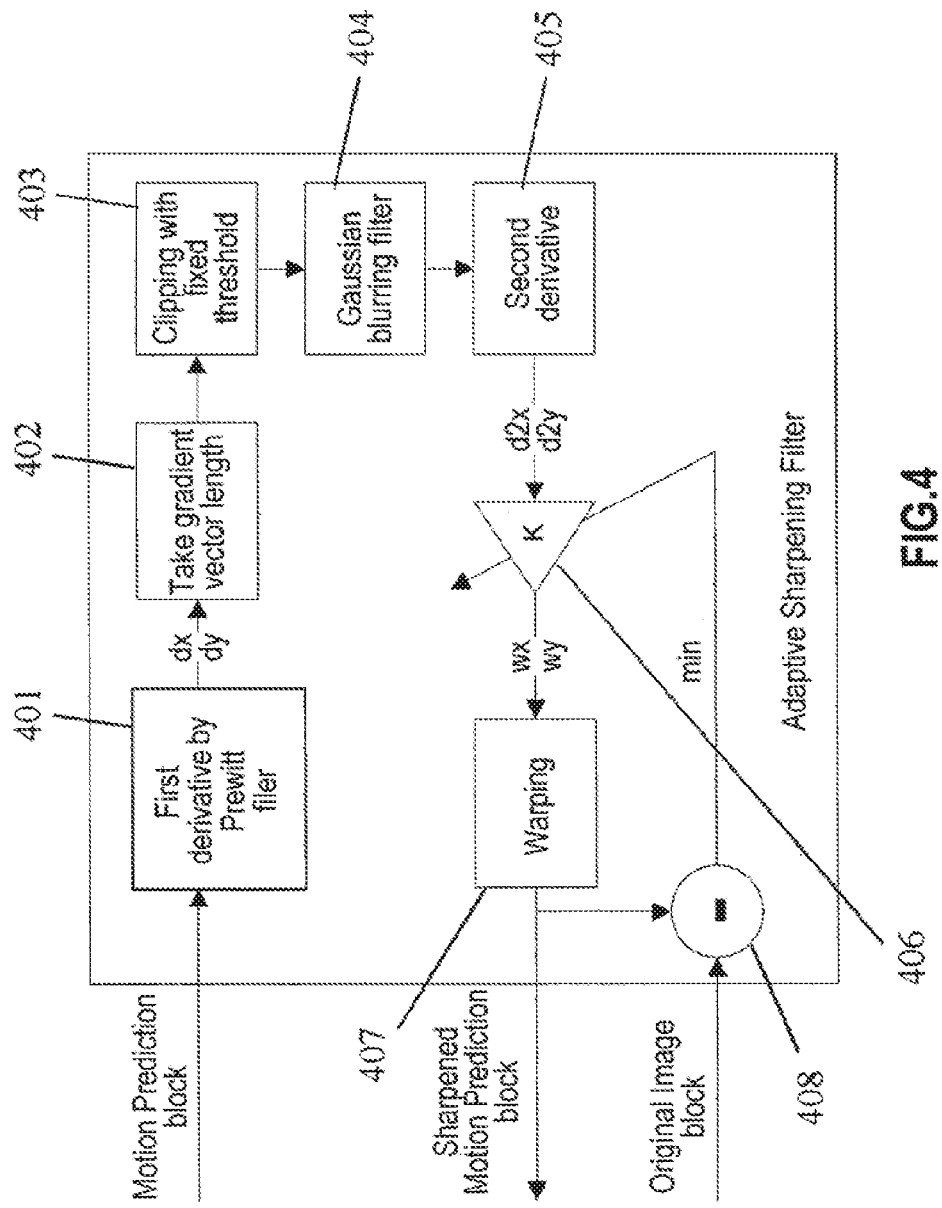
FIG. 4 shows an embodiment of a sharpening filter according to the present disclosure.

FIG. 4 shows an embodiment of an adaptive sharpening filter 400 according to the present disclosure, and particularly an embodiment of the adaptive sharpening filter 211 of the video coder 200. The adaptive sharpening filter 311 of the video decoder 300 is slightly different from the adaptive sharpening filter 211 shown in FIG. 4, the difference being discussed below.

The sharpening filter 400 is preferably a non-linear filter. The usage of a non-linear sharpening filter, instead of a linear filter, is preferable for removing artifacts caused by the motion interpolation filter and the quantization of the reference block or frame. The choice of a non-linear filter can reduce the number of adaptive parameters of the sharpening filter 400. In particular, the non-linear filter can utilize a single adaptive parameter, so that the signaling overhead of the encoded video bit stream is reduced. While the present disclosure also covers the use of more than one adaptive parameter, a sharpening filter 400 utilizing a single adaptive parameter is a particularly advantageous embodiment.

Particularly, the sharpening filter 400 comprises an edge map calculation unit 401, 402, a blurring filter 404, a high-pass filter 405, a scaling unit 406 and a warping unit 407.

The edge map calculation unit 401, 402 is adapted to generate an edge map of a source block, said source block being the reference block or the prediction block. The blurring filter 404 is adapted to blur the edge map of the source block. The high-pass filter 405 is adapted to generate, by high-pass filtering the blurred edge map, a derivative vector (d2x, d2y) for each position of the source block. The scaling unit 406 is adapted to generate a displacement vector (wx, wy) by scaling the derivative vector (d2x, d2y) with a sharpening strength coefficient k. The warping unit 407 is adapted to warp the prediction block based on the displacement vector (wx, wy).

Thereby, the adaptive parameter of the sharpening filter 400 is the sharpening strength coefficient k. The sharpening filter 400 shown in FIG. 4 is an embodiment of the present disclosure with only one adaptive parameter.

The edge map calculation unit 401, 402 can comprise a gradient vector unit 401 adapted to generate a gradient vector (dx, dy) for each position of the source block, and a gradient vector length unit 402 adapted to calculate the length of the gradient vector (dx, dy) of each position so as to generate the edge map of the source block. Thereby, this structure allows for the generation of an edge map that can be further processed by the blurring filter, the high-pass filter and the scaling unit to generate the warping displacement vector.

The gradient vector can be obtained by taking the first derivative separately for dx and dy, i.e. separately for both a horizontal and a vertical direction of the source block referred to as source block in FIG. 4, by applying a corresponding Prewitt filter in accordance with the following equations:

$$dx = \begin{bmatrix} 1 & 0 & -1 \\ 1 & 0 & -1 \\ 1 & 0 & -1 \end{bmatrix} * img$$

$$dy = \begin{bmatrix} 1 & 1 & 1 \\ 0 & 0 & 0 \\ -1 & -1 & -1 \end{bmatrix} * img$$

The edge map can be obtained by the gradient vector length unit 402 by calculating the gradient vector length in accordance with the following equation:

$$abs = \sqrt{dx^2 + dy^2}$$

Advantageously, the sharpening filter 400 comprises a clipping unit 403 adapted to clip the edge map of the source block, said clipping unit 403 being located between the edge map calculation unit 401, 402 and the blurring filter 404. Thereby, the clipping of the edge map with thresholds is advantageous in that it prevents the processing of extremely high and low values of warping vectors.

The step of blurring of the clipped edge map can be obtained by a blurring filter 404 in form of a Gaussian filter that can be defined as follows:

$$G = \begin{bmatrix} 1 & 4 & 7 & 4 & 1 \\ 4 & 16 & 26 & 16 & 4 \\ 7 & 26 & 41 & 26 & 7 \\ 4 & 16 & 26 & 16 & 4 \\ 1 & 4 & 7 & 4 & 1 \end{bmatrix}$$

The high-pass filter is used to obtain, separately for d2x and d2y, the second derivative, for example according to the followings:

$$d^2x = \begin{bmatrix} 1 & 0 & -1 \end{bmatrix}$$

$$d^2y = \begin{bmatrix} 1 \\ 0 \\ -1 \end{bmatrix}$$

The displacement vector (wx,wy) is obtained by scaling the second derivative vector (d2x, d2y) with the coefficient k, wherein the coefficient k can be considered as sharpening strength, according to the following equations:

$$wx = k * d^2x$$

$$wy = k * d^2y$$

The warping unit 407 includes an interpolation filter that is e.g. a bi-linear interpolation filter to obtain sample values at fractional-pel positions. The warping unit 407 uses the displacement vector generated by the scaling unit 406. Thereby, the overall quality of the video coder is improved while at the same time providing an interpolation of the reference frame/block on desired fractional-pel positions.

A subtracting unit 408 is adapted to build the difference between the sharpened prediction block generated by the warping unit 407 and the current block, said current block corresponding to the block to be encoded. The subtracting unit 408 in fact generates the residual block. The adaptive sharpening filter 400, or the control unit 211 controlling the adaptive sharpening filter 400, is adapted to find the optimum sharpening strength k for example by minimizing the residual block or by a cost criterion based, e.g., on the rate-distortion.

The difference between the adaptive sharpening filters of the video coder 200 and of the video decoder 300 preferably consists in subtracting unit 408 and in minimization of the residual block. In the video decoder 300, the adaptive parameter, i.e. the coefficient k, may not be set by means of the subtracting unit 408 and the minimization of the residual block. Instead, the adaptive parameter may be set in the video decoder 300, preferably depending on signaling data reflecting the value of the coefficient k, said signaling data being part of the encoded video bit stream and being set by the video coder 200.

Figure 7:
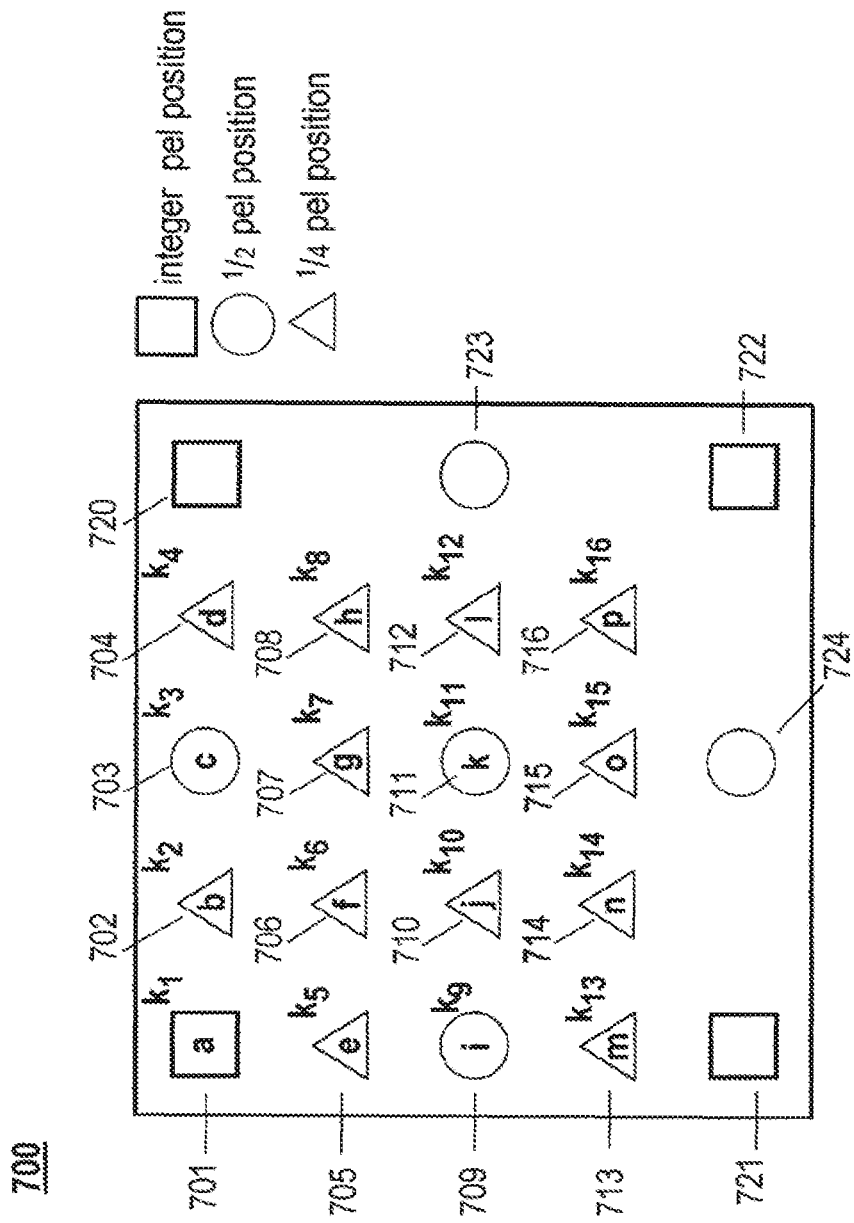
FIG. 7 shows a sharpening pattern according to an embodiment of the present disclosure.
Figure 8:
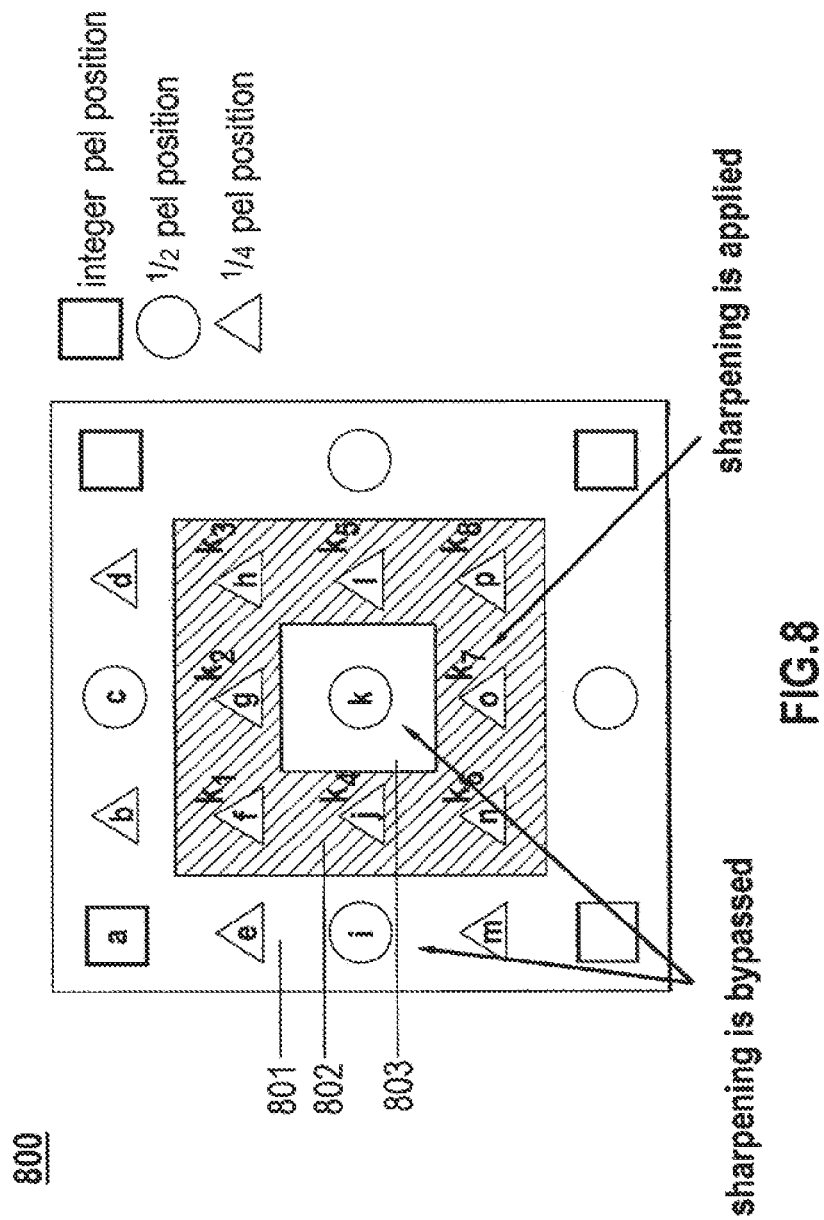
FIG. 8 shows a sharpening pattern according to a further embodiment of the present disclosure.
Figure 9:
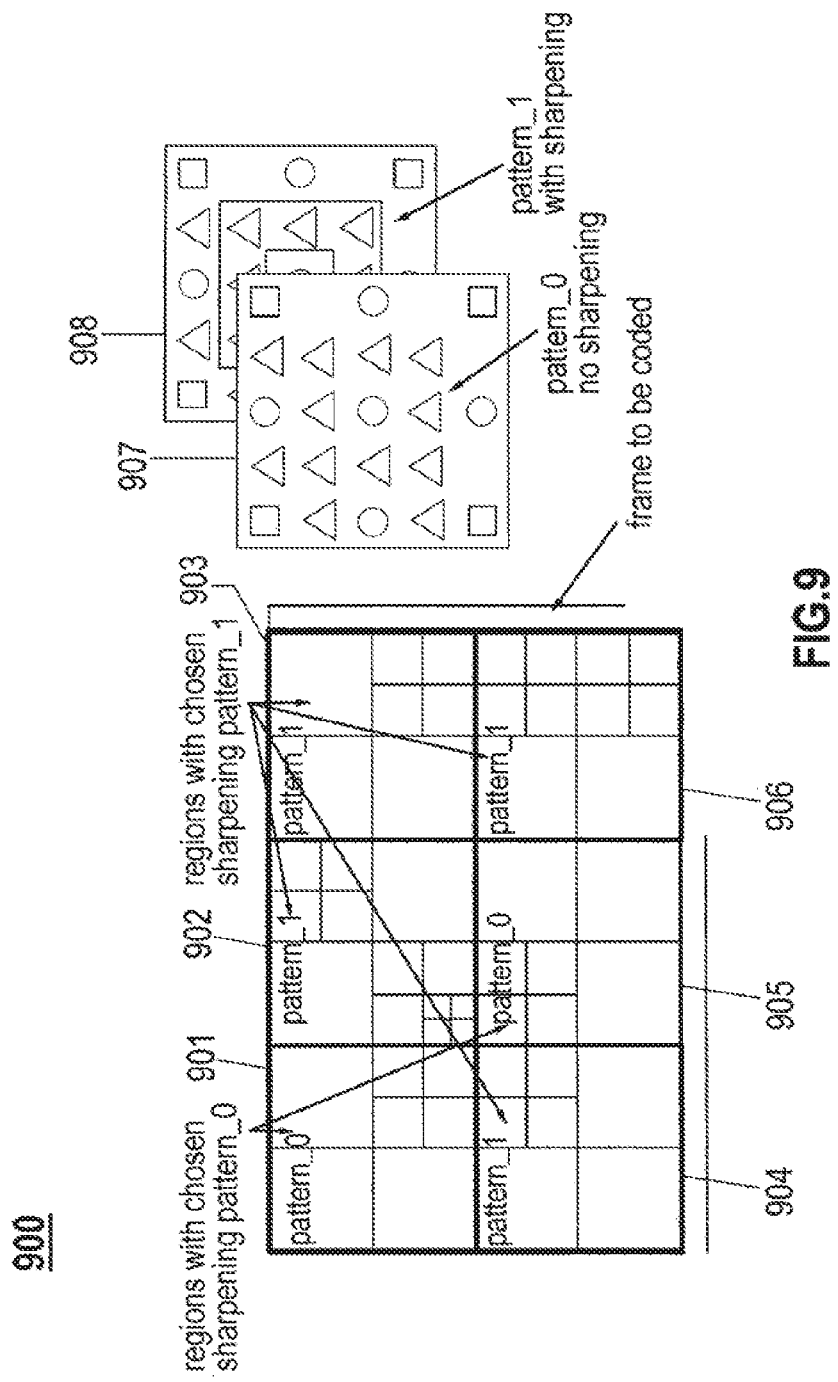
FIG. 9 shows an embodiment of the present disclosure with different sharpening patterns.

For example, as explained in more detail in FIGS. 7 to 9, the motion vector is associated (in a predetermined or adaptive manner) with sharpening information, such as, for example, a sharpening strength coefficient ki, i=1 . . . 16. Thus, the motion vector that is encoded as signaling data in the encoded video bit stream may indirectly signal a value for sharpening strength coefficient ki.

The sharpening filter 400 comprises a warping based on a displacement vector calculated from the source block, which source block is referred to in FIG. 4 as motion prediction block.

According to an embodiment not shown in FIG. 4, the source block is the reference block of the reference frame stored in the frame buffer 207, 307, such that the displacement vector (wx, wy) is derived from the reference block. Thereby, the reference block is used as source block for obtaining the displacement vectors, which are also called sharpening displacement vectors or warping displacement vectors. The warping is then applied to the prediction block using the obtained displacement vector. This embodiment is advantageous in that is saves computational resources on the coder side.

According to the alternative embodiment of FIG. 4, the source block is the prediction block generated by the inter prediction unit 210, 310, such that the displacement vector (wx, wy) is derived from the prediction block.

Thereby, choosing the prediction block as source block allows for the calculation of suitable displacement vectors for carrying out the warping of the prediction block. Also, the sharpening filter then only requires one input for the prediction block and a second input for the reference block is not needed.

FIG. 5 shows a video coding method according to an embodiment of the present disclosure, and particularly a method 500 for predictive coding a video stream of subsequent frames according to motion compensation into an encoded video bit stream.

The method 500 comprises a step 501 of storing at least one reference frame of the video stream, said reference frame being different from a current frame of the video stream.

The method 500 further on comprises an inter prediction step 502 comprising generating a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions.

The method 500 further on comprises a sharpening filter step 503, which includes applying a sharpening filter to the prediction block.

The method 500 further on comprises a step 504 of controlling the application of sharpening filter step depending on the integer or fractional position of the motion vector used for generating the prediction block. Said controlling step is explained in more detail, for example, in FIGS. 7 to 9.

FIG. 6 shows a video decoding method according to an embodiment of the present disclosure, and particularly a method 600 for decoding an encoded video bit stream obtained by predictive coding a video stream of subsequent frames according to motion compensation.

The method 600 comprises a step 601 of storing at least one reference frame obtained from the encoded video bit stream, said reference frame being different from a current frame of the encoded video bit stream.

The method 600 comprises an inter prediction step 602 comprising generating a prediction block of a current block of the current frame from a reference block of the reference frame. Said prediction block is generated by means of a motion vector having a fractional-pel resolution, said fractional-pel resolution defining for each integer position of a motion vector a plurality of associated fractional positions. Preferably, the motion vector is obtained from the encoded video bit stream, said motion vector being encoded in the encoded video bit stream as signaling data.

The method 600 comprises a sharpening filter step 603, which includes applying a sharpening filter to the prediction block.

The method 600 comprises a step 604 of controlling the sharpening filter step 603 depending on the integer or fractional position of the motion vector used for generating the prediction block. Said controlling step is explained in more detail, for example, in FIGS. 7 to 9.

Further aspects and features described with respect to the video coder 200 or the video decoder 300 are also applicable to the coding method 500 and the decoding method 600.

FIG. 7 shows a sharpening pattern according to an embodiment of the present disclosure.

The sharpening pattern can be utilized to effectively signal from a video coder to a video decoder what coefficient of the adaptive parameter has been chosen by the coder during coding/optimization.

The fractional space of motion vectors comprises several pel positions. In modern video codecs like H.264/AVC and H.265/HEVC, the motion vector has typically a ¼ pel resolution in both dimensions X and Y. FIG. 7 shows an embodiment of the present disclosure according to such a ¼ pel resolution. This resolution implies a total of 4×4=16 possible positions. These possible positions include one integer position 701 identified as a square 'a', as well as 15 fractional positions 702 to 716 associated with integer position 701. The fractional positions comprise 3½ pel positions 703, 709, 711 identified in FIG. 7 as circles 'c', 'i' and 'k', as well as 12¼ pel positions 702, 704, 705, 706, 707, 708, 710, 712, 713, 714, 715, 716 identified as corresponding triangles in FIG. 7.

Embodiments may include only integer position, only ½ pel positions, only ¼ pel positions, or a combination thereof, as shown in FIG. 7. One or more fractional positions associated with an integer position may be assigned a value (e.g., sharpening information) such that, for example, only a sub-plurality of motion vectors trigger an application of the sharpening filter.

The sharpening pattern of FIG. 7 defines, for each fractional and/or integer position, a respective sharpening information, such as, for example, a respective sharpening strength coefficient ki, i=1 . . . 16. After motion interpolation for a particular fractional or integer position 701-716, the sharpening filter is applied with the corresponding adaptive parameter, i.e. with the corresponding sharpening strength coefficient ki, that is defined in the sharpening pattern for this particular fractional or integer position 701-716.

The sharpening pattern shown in FIG. 7 comprises the integer position 701 as well as its 15 fractional positions 702 to 716. Beside the integer position 701, FIG. 7 also shows further integer positions 720, 721, 722. These further integer positions may be respectively associated with further sharpening patterns (not shown in FIG. 7). These further sharpening patterns can be the same as the sharpening pattern of the integer position 701, or can be different therefrom.

The coefficients ki could be constant and/or predefined by offline training or chosen based e.g. on previous coding experimentations. The coefficients ki may also be variable and adaptive at a sequence level, GOP level, frame level or region level. In that case, additional signaling such as side information is required.

FIG. 8 shows an exemplary sharpening pattern according to a further embodiment of the present disclosure.

Some fractional or integer positions may have no associated sharpening information. That means that for those positions, the sharpening filter shall not be applied. In this case, only an ordinary motion interpolation without additional sharpening post-filtering is applied.

Correspondingly, the sharpening pattern of FIG. 8 defines sharpening information, i.e., for example, an adaptive parameter ki, only for a subset 802 of the positions of the sharpening pattern. The coefficient ki is, for example, only defined for the positions 706, 707, 708, 710, 712, 714, 715 and 716. A subset 801 of the sharpening pattern comprising the positions 701, 702, 703, 704, 705, 709, 713, as well as a further subset 803 comprising the position 711 are not associated with a coefficient k, which means that for these positions the sharpening filter shall be bypassed.

The fractional position of the motion vector can thus define in the sharpening pattern the value of the adaptive parameter of the sharpening filter 211 and/or a value defining a bypass or application of the sharpening filter. The sharpening pattern may be known both by the coder and by the decoder. It may be predefined or be adaptive and included as side information.

For example, embodiments may include pre-determined/pre-stored sharpening patterns, with the values therein (i.e., sharpening information) set by side information. Side information may further or alternatively define the sharpening patters in a pre-determined or adaptive manner, as further explained in FIG. 9.

FIG. 9 shows an embodiment of the present disclosure with different sharpening patterns.

For some regions of a frame, a sharpening prediction post-filter may be of limited utility. This is, for example, the case for flat regions of the video frame. In such a case, it is better to use a non-sharpened prediction for all fractional points. In other regions of the frame, it may be optimal to define sharpening parameters for the different fractional positions.

To cover these variants, it is proposed to define several different sharpening patterns for some local regions of the frame, choose the best sharpening pattern based e.g. on a cost criterion like rate distortion optimization, and signal to the decoder what sharpening pattern should be used for the motion interpolation in the given region.

Correspondingly, FIG. 9 shows a frame comprising several regions 901, 902, 903, 904, 905, 906, while e.g. two different sharpening patterns are used. The first pattern 907 defines that the sharpening filter shall be bypassed for all positions, while the second pattern 908 defines sharpening information for at least some of the positions of the pattern. For example, the sharpening pattern 908 can correspond to the pattern shown in FIG. 8.

The coder chooses the first pattern 907 for the regions 901 and 905 and the second pattern 908 for the remaining regions 902, 903, 904, and 906. This means that the sharpening prediction post-filter is not applied to the regions 901, 905. During the encoding process, the best sharpening pattern can be chosen for each particular region—e.g. for each largest coding unit (LCU)—and can be signaled to the decoder in one bit, said bit determining the first or the second sharpening pattern 907, 908.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfil the functions of several entities or items recited in the claims. Unless stated otherwise, terms such as "first" and "second" are used to arbitrarily distinguish between the elements such terms describe, in particular for claim dependency reasons. Thus, these terms are not necessarily intended to indicate temporal or other prioritization of such elements (e.g., first and second prediction block filtering).

The mere fact that certain measures are recited in the mutual different dependent claims does not indicate that a combination of these measures cannot be used in an advantageous implementation.

What is claimed is:

1. A video coder for predictive coding a video stream of subsequent frames according to motion compensation into an encoded video bit stream, the video coder comprising:
   a frame buffer, configured to store at least one reference frame of the video stream, wherein the reference frame is different from a current frame of the video stream,
   an inter prediction component, configured to generate a prediction block of a current block of the current frame from a reference block of the reference frame,
   wherein the prediction block is generated by a motion vector having a fractional-pel resolution,
   a sharpening filter, configured to filter the prediction block, and including at least one adaptive parameter, and
   a control component, configured to control the sharpening filter depending on the integer or fractional position of the motion vector used for generating the prediction block by (a) choosing a parameter value for the adaptive parameter depending on the integer or fractional position of the motion vector, and (b) applying the chosen parameter value to the sharpening filter, and wherein at least one integer or fractional position of the motion vector has no associated parameter value, the control component is configured to cause a bypass of the sharpening filter when no parameter value is associated with the position of the motion vector.

2. The video coder according to claim 1, wherein each integer or fractional position of the motion vector is associated with a parameter value for the adaptive parameter.

3. The video coder according to claim 1, comprising a plurality of sharpening filters configured to filter the prediction block, wherein the control component is configured to choose one of the plurality of sharpening filters depending on the integer or fractional position of the motion vector, and to apply the chosen sharpening filter to the prediction block.

4. The video coder according to claim 1, wherein the sharpening filter comprises:
an edge map calculation component, adapted to generate an edge map of a source block, said source block being the reference block or the prediction block,
a blurring filter, adapted to blur the edge map of the source block,
a high-pass filter, adapted to generate, by high-pass filtering the blurred edge map, a derivative vector for each position of the source block,
a scaling component, adapted to generate a displacement vector by scaling the derivative vector with a sharpening strength coefficient, and
a warping component, adapted to warp the prediction block based on the displacement vector,
wherein the adaptive parameter is the sharpening strength coefficient.

5. The video coder according to claim 1, wherein the control component is configured to control at least one of a bypass and an application of a prediction block filtering by the sharpening filter depending on the integer or fractional position of the motion vector.

6. The video coder according to claim 1, wherein a sharpening pattern defines sharpening information for an integer position of a motion vector and sharpening information for one or more associated fractional positions, and
the control component is configured to utilize at least one sharpening pattern, to control the sharpening filter depending on the sharpening information defined in the at least one sharpening pattern at the position corresponding to the motion vector used for generating the prediction block.

7. The video coder according to claim 6, wherein the control component is configured to utilize a single sharpening pattern.

8. The video coder according to claim 7, wherein the control component is configured to modify the single sharpening pattern
for each prediction block,
for an arbitrary or regular region of the current frame,
at a frame level,
a group of pictures (GOP) level,
a picture parameter set (PPS) level, or
a sequence parameter set (SPS) level.

9. The video coder according to claim 6, wherein the control component is configured to utilize a plurality of sharpening patterns and is further configured to select one of the sharpening patterns for each prediction block, for an arbitrary or regular region of the frame, at a frame level, at a group of pictures (GOP) level, at a picture parameter set (PPS) level, or at a sequence parameter set (SPS) level.

10. The video coder according to claim 9, wherein the control component is configured to select one of the sharpening patterns based on a minimization of a residual block, wherein the residual block is the difference between the current block and the prediction block, or based on a rate distortion optimization.

11. The video coder according to claim 9, comprising an encoding component configured to generate the encoded video bit stream, and to add the sharpening pattern selected by the control component in the encoded video bit stream.

12. The video coder according to claim 6, wherein the at least one sharpening pattern is pre-stored in a memory accessible by the control component.

13. The video coder according to claim 6, comprising an encoding component configured to generate the encoded video bit stream, and to add the at least one sharpening pattern of the control component in the encoded video bit stream.

14. The video coder according to claim 6, wherein the control unit is configured to change a quantity of sharpening patterns and/or the sharpening information of the at least one sharpening pattern.

15. The video coder according to claim 14, wherein the quantity of sharpening patterns and/or the sharpening information of the at least one sharpening pattern is changed for each prediction block, for an arbitrary or regular region of the frame, at a frame level, at a group of pictures (GOP) level, at a picture parameter set (PPS) level, or at a sequence parameter set (SPS) level.

16. The video coder according to claim 6, wherein the sharpening information is a value of an adaptive parameter of the sharpening filter or is a value defining an application or bypassing of the sharpening filter.

17. A method for predictive coding a video stream of subsequent frames according to motion compensation into an encoded video bit stream, the method comprising:
storing at least one reference frame of the video stream, wherein the reference frame is different from a current frame of the video stream,
generating a prediction block of a current block of the current frame from a reference block of the reference frame,
wherein the prediction block is generated by a motion vector having a fractional-pel resolution,
applying a sharpening filter to the prediction block, wherein the sharpening filter includes at least one adaptive parameter and
controlling the application of the sharpening filter depending on the integer or fractional position of the motion vector used for generating the prediction block by (a) choosing a parameter value for the adaptive parameter depending on the integer or fractional position of the motion vector, and (b) applying the chosen parameter value to the sharpening filter, and wherein at least one integer or fractional position of the motion vector has no associated parameter value, the sharpening filter is bypassed when no parameter value is associated with the position of the motion vector.

18. A video decoder for decoding an encoded video bit stream obtained by predictive coding a video stream of subsequent frames according to motion compensation, the video decoder comprising:
a frame buffer configured to store at least one reference frame obtained from the encoded video bit stream, wherein the reference frame is different from a current frame of the encoded video bit stream,
an inter prediction component configured to generate a prediction block of a current block of the current frame from a reference block of the reference frame,
wherein the prediction block is generated by a motion vector having a fractional-pel resolution,
a sharpening filter configured to filter the prediction block, and including at least one adaptive parameter, and
a control component configured to control the sharpening filter depending on the integer or fractional position of the motion vector used for generating the prediction block by (a) choosing a parameter value for the adaptive parameter depending on the integer or fractional position of the motion vector, and (b) applying the chosen parameter value to the sharpening filter, and wherein at least one integer or fractional position of the motion vector has no associated parameter value, the control component is configured to cause a bypass of the sharpening filter when no parameter value is associated with the position of the motion vector.

19. The video decoder according to claim 18, wherein the control component is configured to control at least one of a bypass and an application of a first prediction block filtering by the sharpening filter depending on the integer or fractional position of the motion vector.

20. The video decoder according to claim 18, wherein a sharpening pattern respectively defines sharpening information for an integer position of a motion vector and one or more associated fractional positions, and the control component is configured to utilize at least one sharpening pattern, to control the sharpening filter depending on the sharpening information defined in the at least one sharpening pattern at the position corresponding to the motion vector used for generating the prediction block.

21. The video decoder according to claim 20, comprising a decoding component configured to decode at least one sharpening pattern from the encoded video bit stream, wherein the control component is configured to control the sharpening filter depending on the sharpening information defined in the sharpening pattern decoded by the decoding component.

22. The video decoder according to claim 20, wherein the sharpening pattern is used for each prediction block, for an arbitrary or regular region of the frame, at a frame level, at a group of pictures (GOP) level, at a picture parameter set (PPS) level, or at a sequence parameter set (SPS) level depending on selected sharpening pattern information of the encoded video bit stream.

23. The video decoder according to claim 20, wherein the at least one sharpening pattern is pre-stored in a memory accessible by the control component.

24. The video decoder according to claim 20, wherein the control component is configured to utilize a single sharpening pattern.

25. The video decoder according to claim 24, wherein the single sharpening pattern is pre-stored in a memory accessible by the control component.

26. The video decoder according to claim 25, wherein the control component is configured to modify the single sharpening pattern for each prediction block, for an arbitrary or regular region of the current frame, at a frame level, at a group of pictures (GOP) level, at a picture parameter set (PPS) level, or at a sequence parameter set (SPS) level.

27. The video decoder according to claim 25, wherein the control component is configured to modify the single sharpening pattern for each prediction block, for an arbitrary or regular region of the current frame, at a frame level, at a group of pictures (GOP) level, at a picture parameter set (PPS) level, or at a sequence parameter set (SPS) level depending on sharpening pattern information of the encoded video bit stream.

28. The video decoder according to claim 20, wherein the sharpening information is a value of an adaptive parameter of the sharpening filter or is a value defining an application or bypassing of the sharpening filter.

29. A method for decoding an encoded video bit stream obtained by predictive coding a video stream of subsequent frames according to motion compensation, the method comprising:

storing at least one reference frame obtained from the encoded video bit stream, wherein the reference frame is different from a current frame of the encoded video bit stream, generating a prediction block of a current block of the current frame from a reference block of the reference frame, wherein the prediction block is generated by a motion vector having a fractional-pel resolution, applying a sharpening filter to the prediction block, and including at least one adaptive parameter, and controlling the application of the sharpening filter depending on the integer or fractional position of the motion vector used for generating the prediction block by (a) choosing a parameter value for the adaptive parameter depending on the integer or fractional position of the motion vector, and (b) applying the chosen parameter value to the sharpening filter, and wherein at least one integer or fractional position of the motion vector has no associated parameter value, the sharpening filter is bypassed when no parameter value is associated with the position of the motion vector.

30. A non-transitory computer readable storage medium having stored thereon a computer program comprising a program code, which when executed by a processor instructs the processor to perform the method according to claim 17, wherein the computer program runs on a computing device.

31. A non-transitory computer readable storage medium having stored thereon a computer program comprising a program code, which when executed by a processor instructs the processor to perform the method according to claim 29, wherein the computer program runs on a computing device.

* * * * *